(12) United States Patent
Machireddy

(10) Patent No.: US 12,425,996 B2
(45) Date of Patent: Sep. 23, 2025

(54) ADVERTISING SYNCHRONIZATION STATUS AND VALIDITY IN WIRELESS COMMUNICATION SYSTEMS

(71) Applicant: Rakuten Symphony, Inc., Tokyo (JP)

(72) Inventor: Ramana Reddy Machireddy, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/792,595

(22) PCT Filed: Jul. 12, 2022

(86) PCT No.: PCT/US2022/036818
§ 371 (c)(1),
(2) Date: Jul. 13, 2022

(87) PCT Pub. No.: WO2023/229614
PCT Pub. Date: Nov. 30, 2023

(65) Prior Publication Data
US 2024/0224208 A1   Jul. 4, 2024

(30) Foreign Application Priority Data
May 27, 2022 (IN) .............................. 202241030411

(51) Int. Cl.
*H04W 56/00* (2009.01)
*H04W 76/19* (2018.01)

(52) U.S. Cl.
CPC ......... *H04W 56/002* (2013.01); *H04W 76/19* (2018.02)

(58) Field of Classification Search
CPC ........................... H04W 56/002; H04W 76/19
See application file for complete search history.

(56) References Cited

U.S. PATENT DOCUMENTS

| | | | |
|---|---|---|---|
| 6,618,455 B1 | 9/2003 | Maeda et al. | |
| 9,990,928 B2* | 6/2018 | Hardwick | G10L 19/018 |
| 11,005,585 B1* | 5/2021 | Gopalakrishnan | H04L 12/4641 |
| 11,232,007 B2* | 1/2022 | Hashimoto | G06F 11/2076 |
| 11,375,464 B2* | 6/2022 | Gulati | H04W 56/0025 |
| 11,722,977 B2* | 8/2023 | Yoon | H04L 27/2675 370/350 |

(Continued)

OTHER PUBLICATIONS

ECPRI Specification V2.0, "Common Public Radio Interface: eCPRI Interface Specification," May 10, 2019.

(Continued)

*Primary Examiner* — Bailor C Hsu
(74) *Attorney, Agent, or Firm* — Sughrue Mion, PLLC

(57) ABSTRACT

A method, a system, and a computer program product for transmitting synchronization information in a wireless communication system. A synchronization communication status is received from one or more communication devices communicating in a wireless communication system. Based on the received synchronization communication status, at least one communication device in the one or more communication devices is selected and a communication link is synchronized with the selected at least one communication device. At least one data packet is transmitted using the synchronized communication link.

20 Claims, 13 Drawing Sheets

(56) References Cited

U.S. PATENT DOCUMENTS

| | | | |
|---|---|---|---|
| 2009/0245228 A1* | 10/2009 | Osterling | H04J 3/0638 |
| | | | 370/350 |
| 2010/0041392 A1* | 2/2010 | Hirata | H04W 24/04 |
| | | | 455/425 |
| 2010/0172454 A1 | 7/2010 | Denteneer | |
| 2012/0014488 A1 | 1/2012 | Liu et al. | |
| 2016/0092537 A1* | 3/2016 | Vieira | G06F 16/23 |
| | | | 707/634 |
| 2016/0183205 A1* | 6/2016 | Li | H04W 56/001 |
| | | | 370/350 |
| 2017/0099131 A1* | 4/2017 | Bosch | H04L 7/0016 |
| 2020/0245341 A1 | 7/2020 | Wu et al. | |
| 2020/0367076 A1* | 11/2020 | Lam | H04W 92/12 |
| 2021/0051494 A1* | 2/2021 | Anand | H04L 41/0654 |
| 2021/0243797 A1 | 8/2021 | Reddy et al. | |

OTHER PUBLICATIONS

International Search Report and Written Opinion for International Patent Application No. PCT/US2022/036818 mailed Nov. 23, 2022.

\* cited by examiner

ADVERTISING SYNCHRONIZATION STATUS AND VALIDITY IN WIRELESS COMMUNICATION SYSTEMS

CROSS-REFERENCE TO RELATED APPLICATIONS

This application is a U.S. National Stage of International Application No. PCT/US22/36818, filed Jul. 12, 2022, entitled "Advertising Synchronization Status and Validity in Wireless Communication Systems", which claims priority to Indian Patent Application No. 202241030411 to Ramana Reddy Machireddy, filed May 27, 2022, and entitled "Advertising Synchronization Status and Validity in Wireless Communication Systems", and incorporates its disclosure herein by reference in their entireties.

TECHNICAL FIELD

In some implementations, the current subject matter relates to telecommunications systems, and in particular, to advertising synchronization status and validity over common public radio interface (CPRI) in wireless communication systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5GNR are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

To ensure proper efficient and proper functioning of the air interface, communications networks implement various frequency and timing requirements. However, currently implemented protocols are not capable of providing effective synchronization of timing to base stations.

SUMMARY

In some implementations, the current subject matter relates to a computer implemented method for transmitting synchronization information in a wireless communication system. The method may include receiving, using at least one processor, a synchronization communication status from one or more communication devices communicating in a wireless communication system, selecting, based on the received synchronization communication status, at least one communication device in the one or more communication devices, and synchronizing a communication link with the selected at least one communication device, and transmitting at least one data packet using the synchronized communication link.

In some implementations, the current subject matter may be configured to include one or more of the following optional features. The synchronization communication status may be received using a common public radio interface (CPRI).

In some implementations, the receiving may further include receiving a validity indicator indicating a validity of the synchronization communication status associated with the one or more communication devices. The selected communication device may be selected based on the validity of the synchronization communication status.

In some implementations, the receiving may further include receiving a priority indicator indicating a communication priority associated with each communication device in the one or more communication devices. The selecting may further include selecting the at least one communication devices having a highest communication priority. The method may also include determining, based on the transmitting, a failure to communicate with the selected at least one communication device using the synchronized communication link, selecting at least another communication device in the one or more communication devices and synchronizing another communication link with the selected at least another communication device, an transmitting the at least one data packet using the synchronized another communication link.

In some implementations, one or more communication devices may include at least one of the following: a base station, a gNodeB base station, an eNodeB base station, and any combination thereof. One or more communication devices may include one or more distributed units. One or more radio interface units having one or more remote radio heads may be configured to execute at least one of the receiving, the selecting, and the transmitting. The base station may be a base station operating in at least one of the following communications systems: a long term evolution communications system and a new radio communications system.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

The current subject matter can provide for systems and methods that can be implemented in wireless communications systems. Such systems can include various wireless communications systems, including 5G New Radio communications systems, long term evolution communication systems, etc.

In some implementations, the current subject matter relates to advertise and/or communication a synchronization status and/or a synchronization validity associated with one or more communication devices (e.g., one or more baseband units) to one or more other communication devices (e.g., one or more remote radio heads) in wireless communication system. Such synchronization information may be used to determine which remote radio head may be selected and/or used for further communication, such as transmission of data packets associated with wireless communications between various devices (e.g., user equipment, base stations, etc.). Such selected remote radio head may be synchronized with and/or locked with the baseband unit and/or vice versa. The synchronization information may be transmitted via a common public radio interface (CPRI).

In some implementations, to perform such synchronization with and/or locking with, the current subject matter may be configured to receive, using at least one processor (e.g., that may be part of a radio interface unit having one or more remote radio heads), a synchronization communication status from one or more communication devices (e.g., a distributed unit, a baseband unit, etc.) communicating in a wireless communication system (e.g., an LTE, 4G, 5G, etc. systems). Once received, the processor may be configured to select, based on the received synchronization communication status, at least one communication device and synchronize a communication link with the selected communication device. Once synchronized, data packets may be transmitted using the synchronized communication link.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
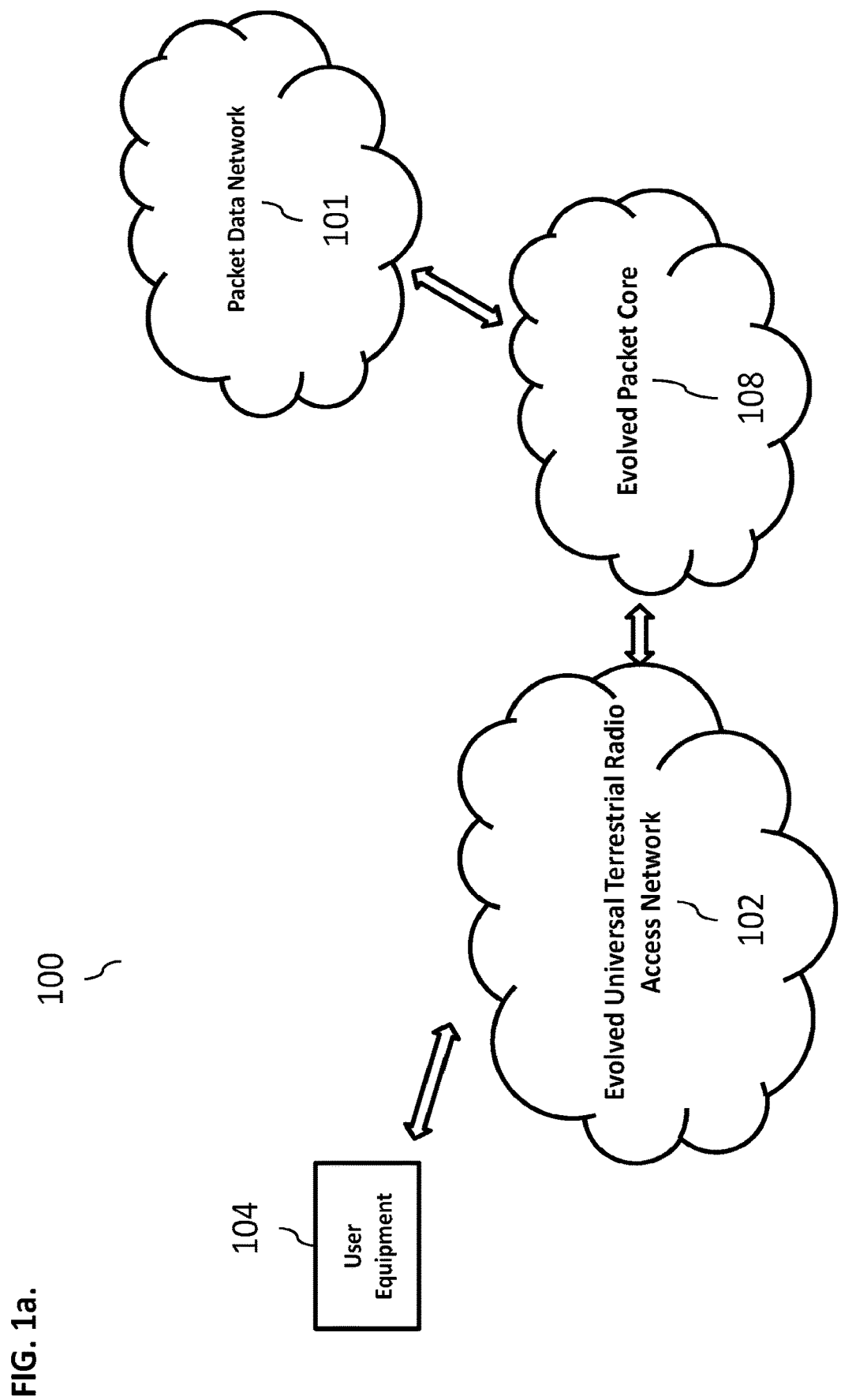
FIG. 1a illustrates an exemplary conventional long term evolution ("LTE") communications system.
Figure 1B:
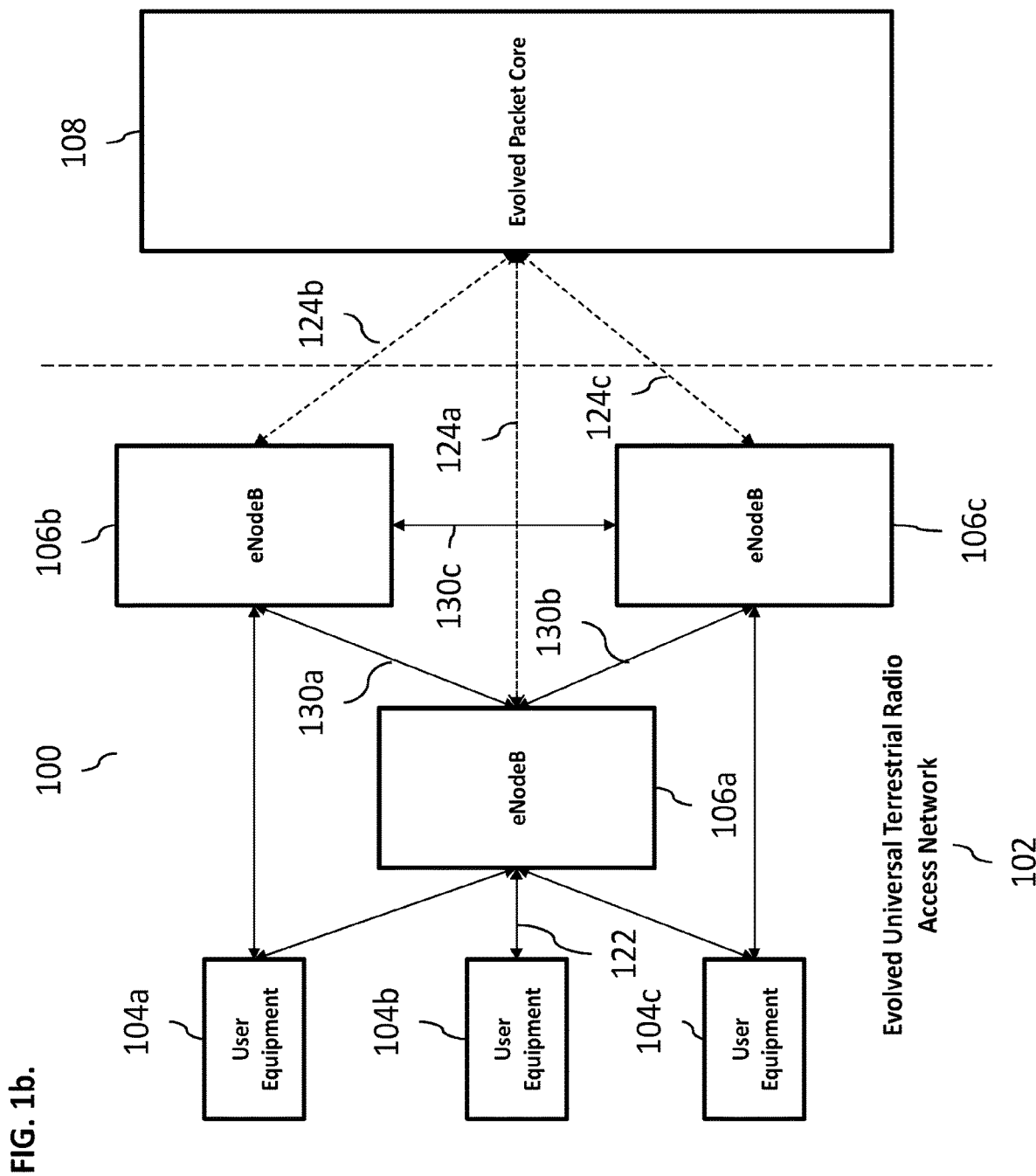

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
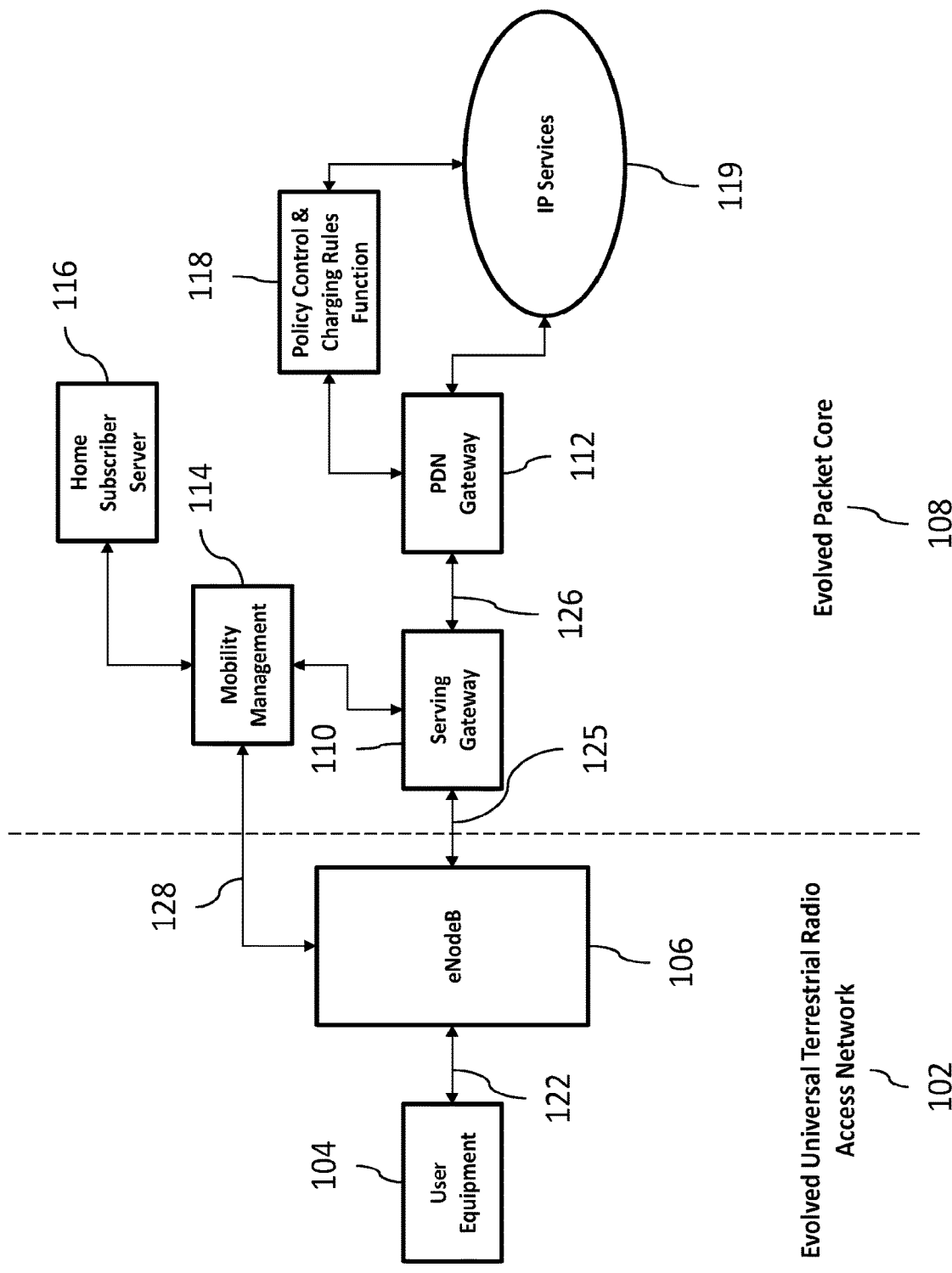

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
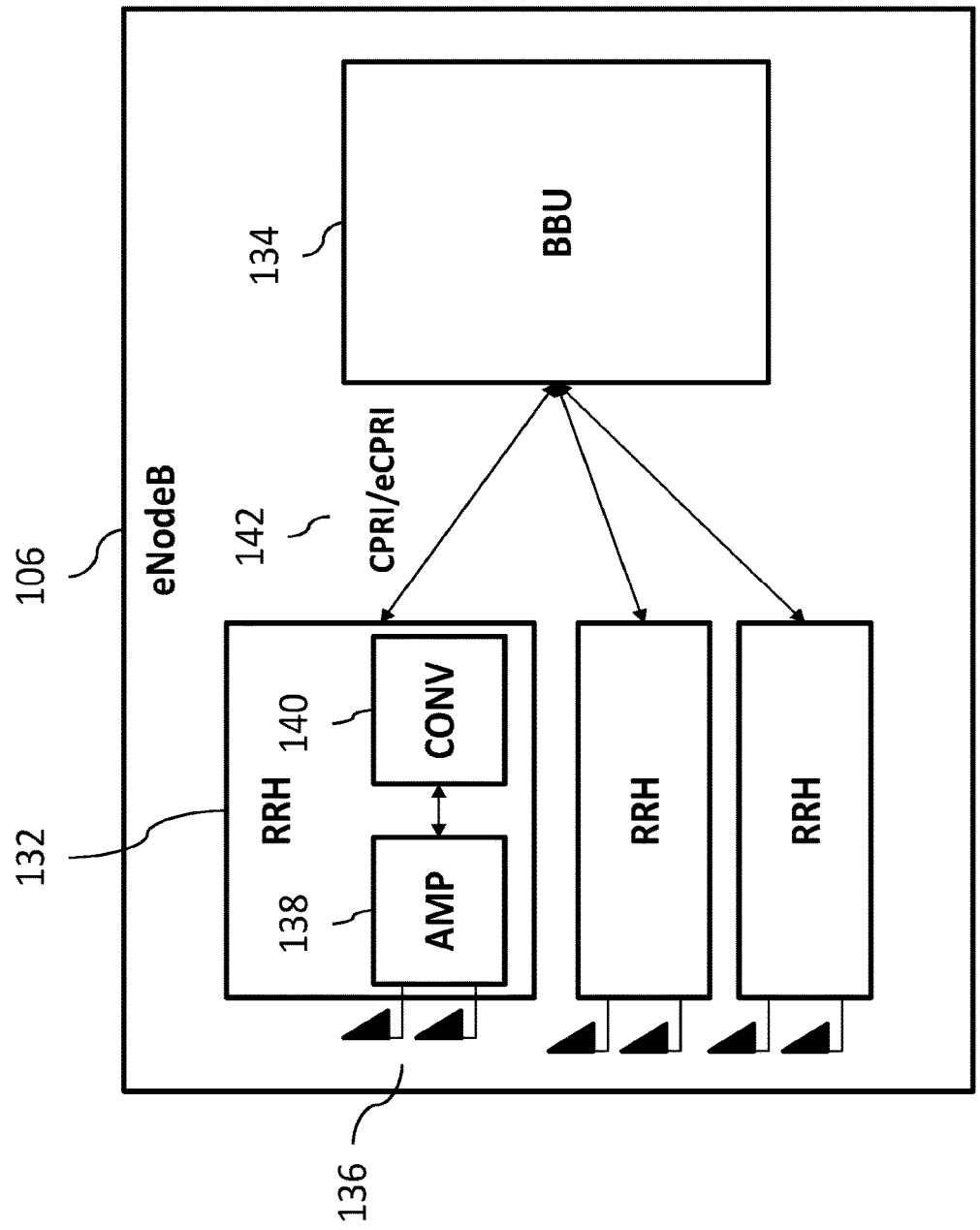

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
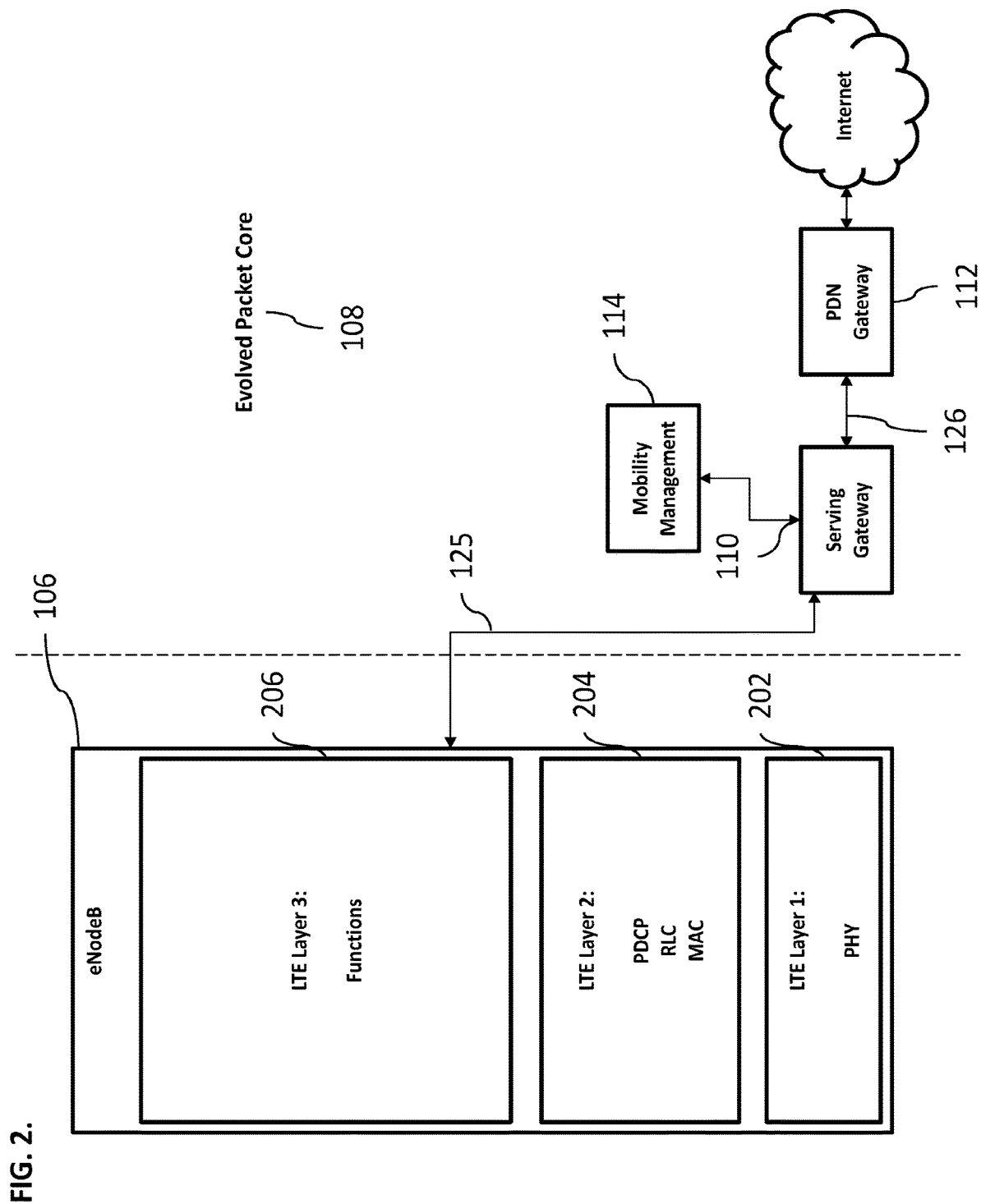
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
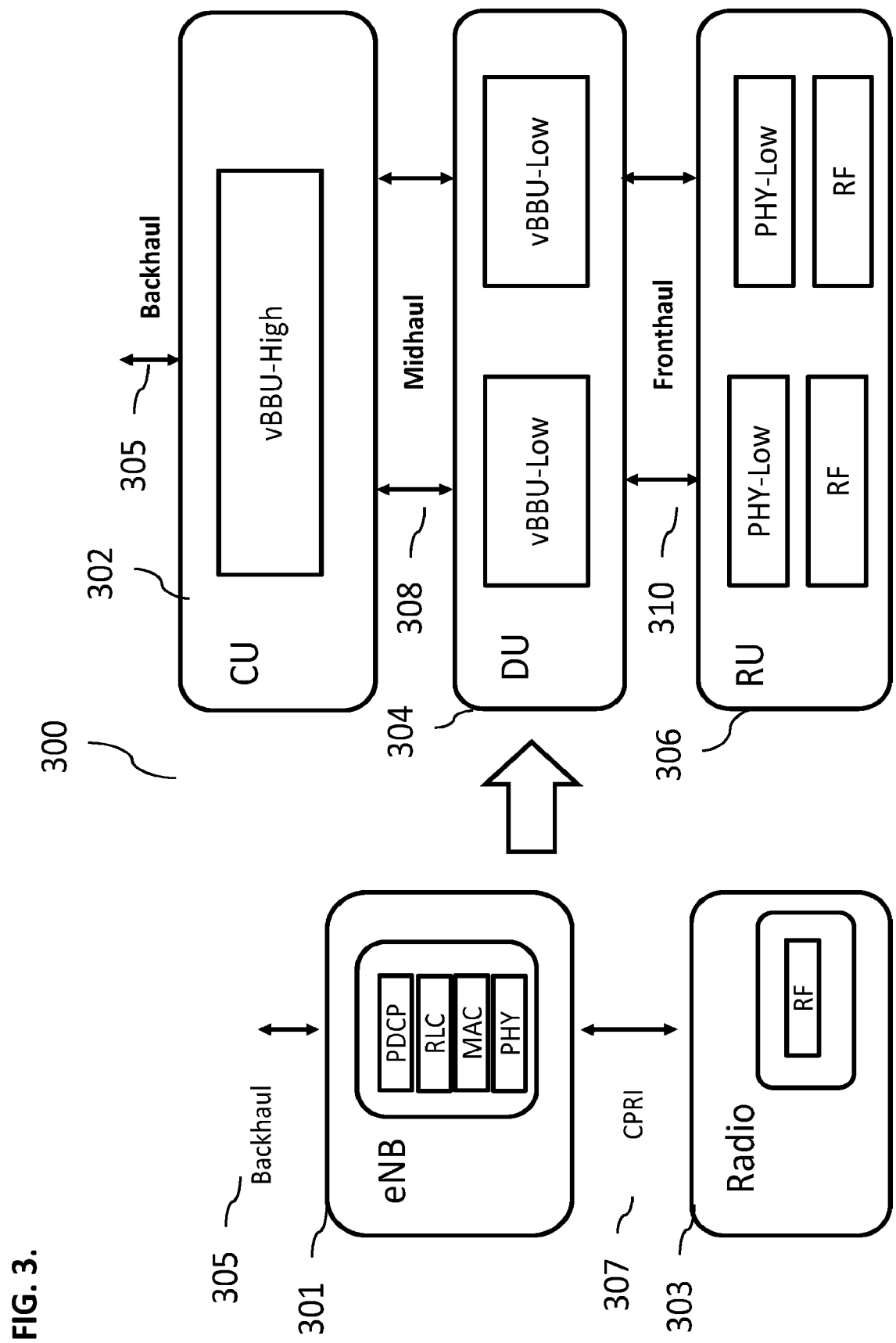
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
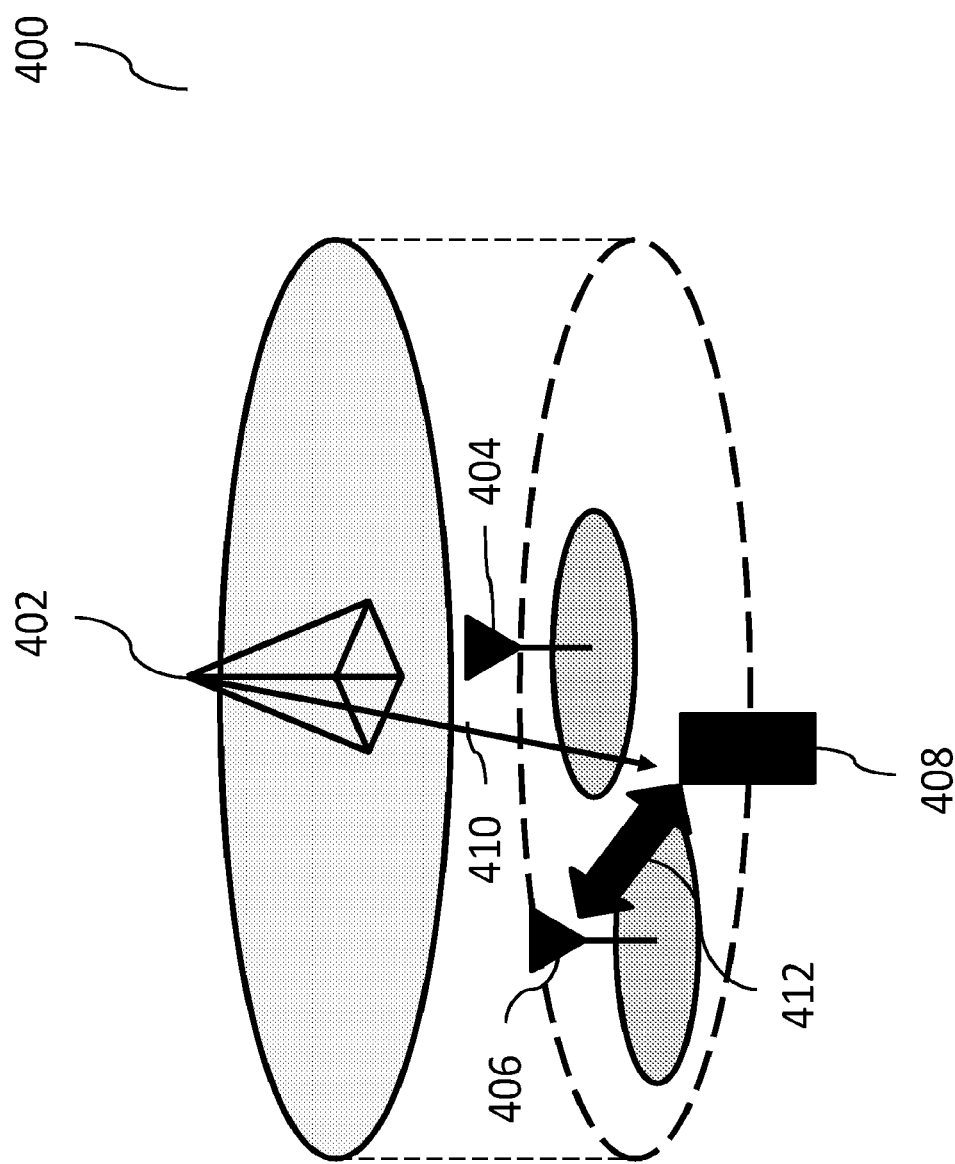
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
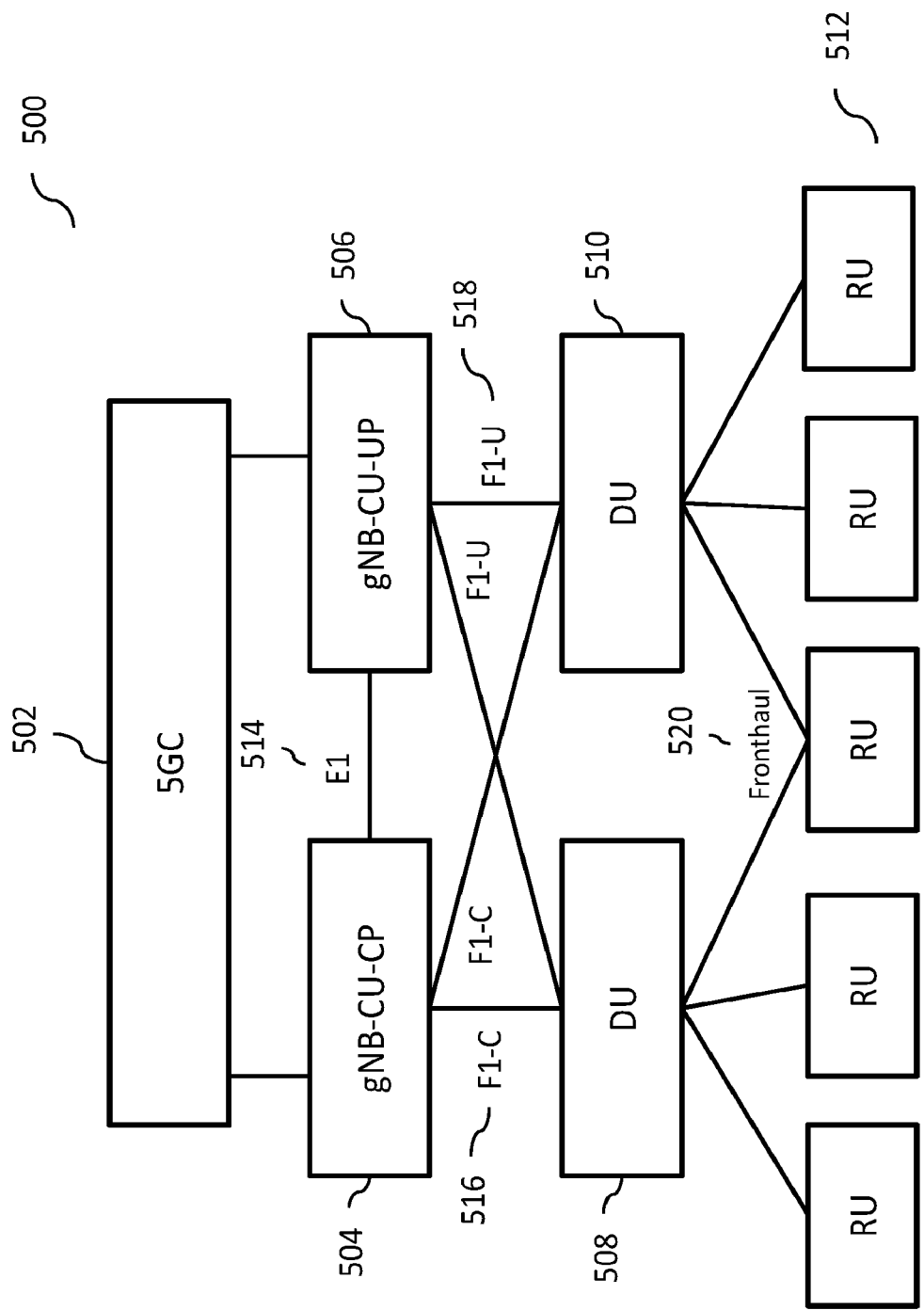
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
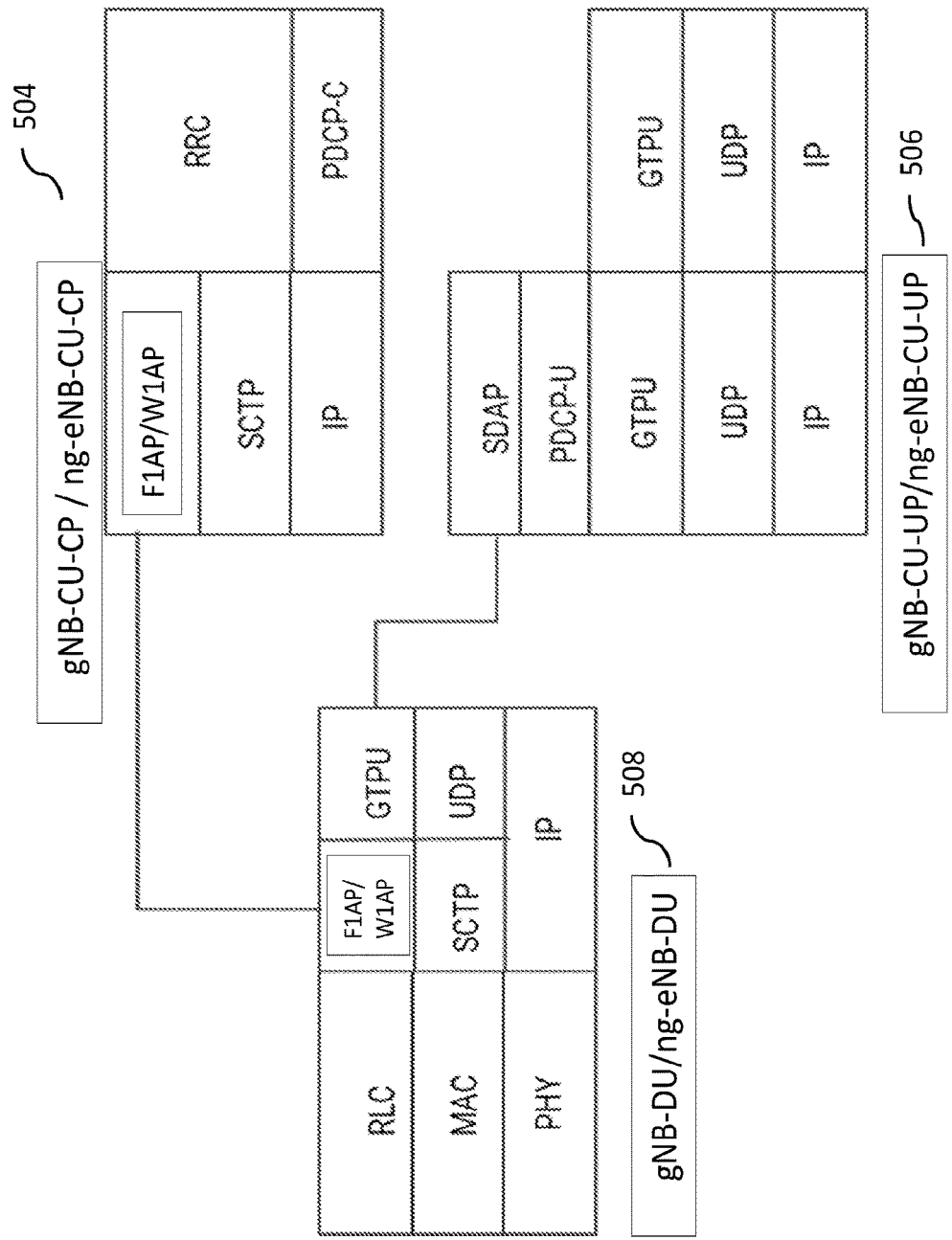
FIG. 5b illustrates an exemplary layer architecture of the split gNB and/or a split ng-eNB (e.g., next generation eNB that may be connected to 5GC)

FIG. 5b illustrates an exemplary layer architecture 530 of the split gNB. The architecture 530 can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
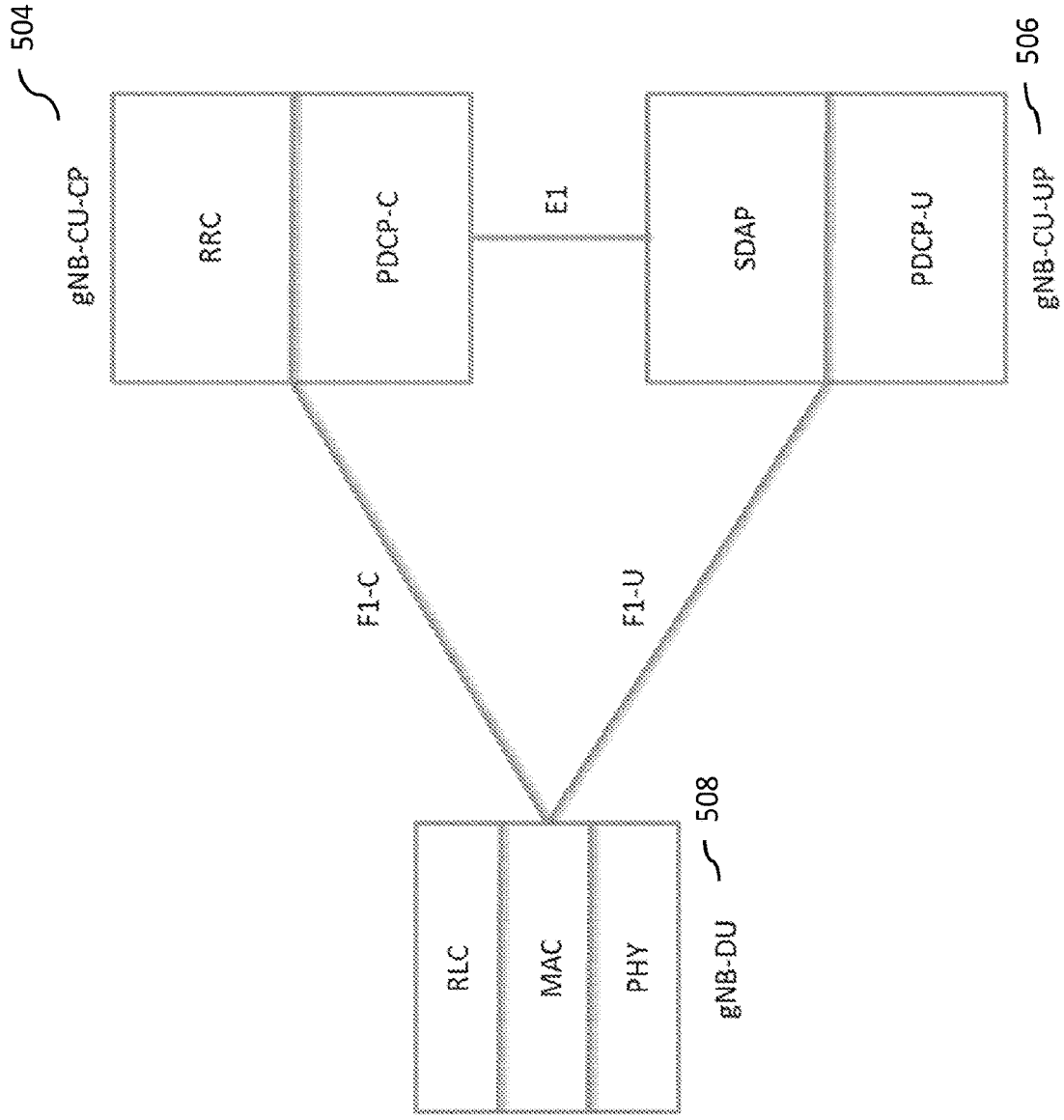
FIG. 5c illustrates an exemplary functional split in the gNB architecture shown in FIGS. 5a-b.

FIG. 5c illustrates an exemplary functional split in the gNB architecture shown in FIGS. 5a-b. As shown in FIG. 5c, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5*c*). As shown in FIG. 5*c*, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Advertising Synchronization Status and Validity of a Communication Link

In some implementations, to the current subject matter may be configured to execute synchronization of various communication links in wireless communication systems. Synchronization of links may be performed for links communicatively coupling one or more baseband units and one or more radio interface units having one or more remote radio heads. Synchronization may be performed over CPRI interface to allow synchronization and/or "locking" of the communication link between specific baseband units and radio interface units.

In existing radio access networks, one or more remote units (RUs (Radio Equipment Control (REC))) may be communicatively coupled to one or more remote radio heads (RRHs), also referred to as radio equipment (RE) over CPRI link as shown, for example in FIG. 1*d*. In some implementations, multiple RUs may be communicatively coupled to a single RRH where each RU may be operating in different types of wireless communication protocols (e.g., 4G, LTE, 5G, etc.), while the RRH may be capable of supporting such protocols (e.g., 4G and 5G) simultaneously. In these cases, an RRH may be locked to and/or synchronized with one of the remote units that may be configured to act as a clock master and may be further configured to serve all remote units that may be communicatively coupled to that RRH.

However, in some cases, various events, errors and/or faults may impact and/or prevent further communications with the locked/synchronized remote unit. For example, a synchronization plane of the master remote unit may go down and/or cease communicating, various errors may transpire in the synchronization plane of the remote unit, clock degradations associated with the remote unit may occur, etc. All of these may affect operations of the cell as related to all remote units connected to the remote radio head despite availability and/or reachability of the previously synchronized clock from other remote units. This may be problematic because, while other remote units connected to the remote radio head may have the synchronization reachability toward the remote radio head, the remote radio head is unable to detect clock degradation/failure and lock/synchronize to alternate best clock source available.

In some implementations, the current subject matter may be configured to transmit and/or "advertise" synchronization status and validity information associated with such synchronization status (e.g., whether the current synchronization status is still valid or not, whether the clock information is still current) from one or more communication devices (e.g., baseband units, distributed units, etc.) toward one or more RRHs over a communication link (e.g., CPRI), thereby allowing the RRH to determine whether the transmitted clock information (e.g., master clock information) is still valid. Moreover, if the previously transmitted clock information is no longer valid (e.g., no response is received from the baseband unit), the RRH may be configured to switch to a valid clock and synchronize with that clock, which will become a master clock to which other RRHs may synchronize to. The CPRI protocol may be extended to accommodate for the synchronization status that may be transmitted.

In some implementations, the current subject matter may be configured to ensure that during synchronization failures from a master remote unit to one or more RRHs, the RRH may be configured to continue radiating signals associated with cells of other remote units whose synchronization plane is active and may continue to serve the user equipments connected to the RRHs.

Figure 6:
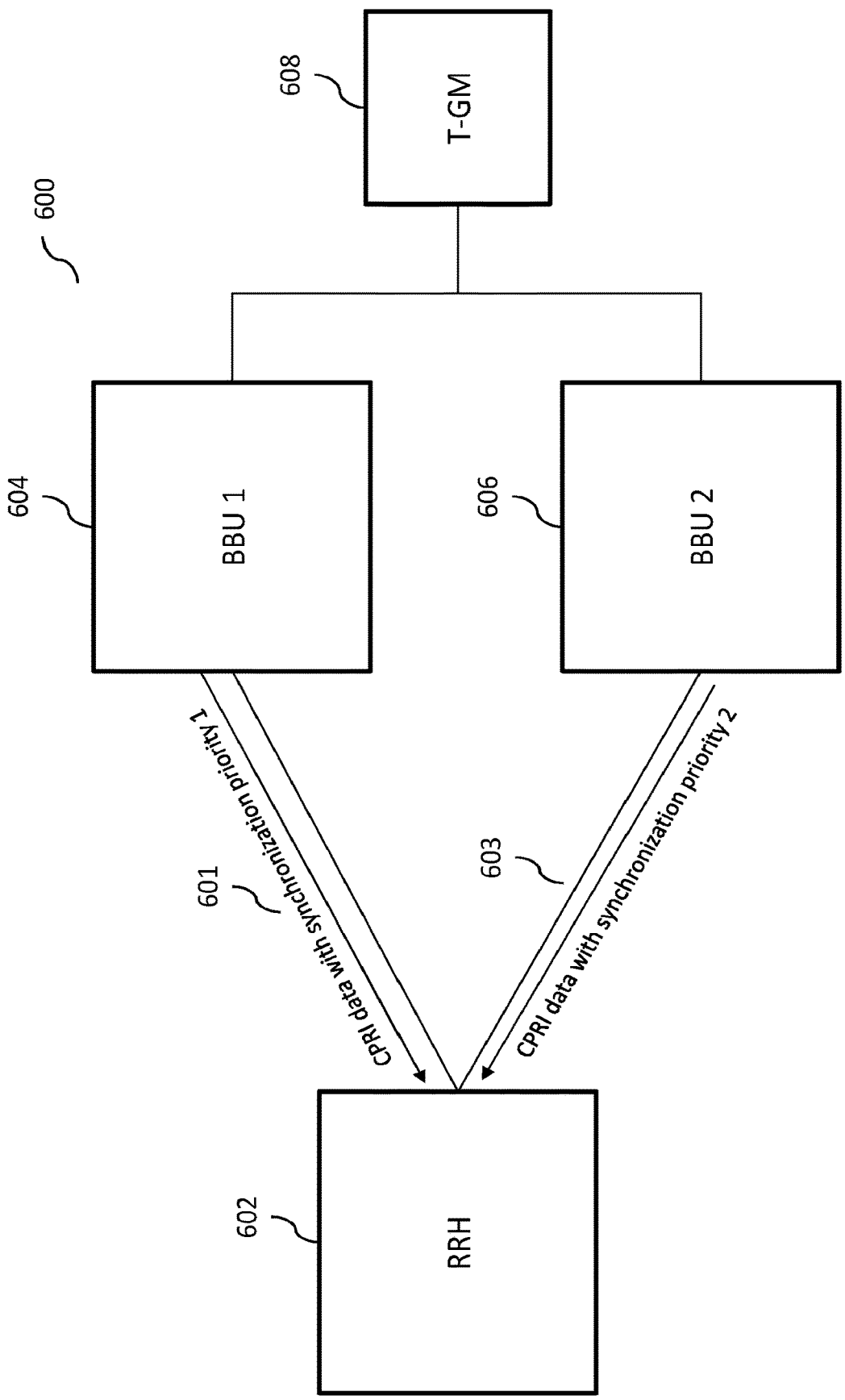
FIG. 6 illustrates an exemplary wireless communication system, according to some implementations of the current subject matter.

FIG. 6 illustrates an exemplary wireless communication system 600, according to some implementations of the current subject matter. The system 600 may include one or more remote radio heads 602, a baseband unit 1 604, a baseband unit 2 606, and a timing grandmaster clock 608 that may be communicatively coupled to the baseband units 604, 606. The baseband unit 604 may be configured to communicate with the remote radio head(s) 602 using a communication link 601. The baseband unit 606 may be configured to communicate with the remote radio head(s) 602 using communication link 603. The communication links 601, 603 may be CPRI communication links and/or any other links. Each component 602-608 may be configured to include hardware, software, and/or any combination thereof.

Each baseband unit 604, 606 may be configured to transmit and/or advertise various data (e.g., using one or more CPRI data packets to the remote radio head(s) 602 that may include synchronization priority information. For example, baseband unit 604 may transmit synchronization priority 1 to the remote radio head(s) 602 using communication link 601, and baseband unit 606 may transmit synchronization priority 2 to the remote radio head(s) 602 using communication link 603. The priority information may be indicative of a timing/synchronization clock (e.g., Telecom Time Slave Clock (T-TSC), an external clock, a local PRTC/GPS, etc.) priority associated with each baseband unit 604, 606. This information may be used by the remote radio head(s) 602 to determine with which baseband unit 604, 606 to synchronize its clock with. As shown in FIG. 6, the baseband unit 604 has a first or higher timing/synchronization priority and thus, the remote radio head(s) 602 may be configured to synchronize with baseband unit's clock first. If the baseband unit 604 is no longer active (e.g., does not respond to remote radio head(s) 602 messages requesting synchronization status and/or validity of synchronization status), the remote radio head(s) 602 may be configured switch to baseband unit 606 and synchronize with its clock, assuming the baseband unit 606 is still active.

The clocks of each baseband unit 604, 606 may be provided by the timing grandmaster 608. The timing grandmaster 608 may transmit synchronization information to the clocks residing on its network segment, whereby, upon selection of a grandmaster, all other clocks may synchronize directly to it. A precision time protocol (PTP) (as originally defined in IEEE 1588-2002 standard) may be used to synchronize clocks throughout the system 600. The PTP can be used to achieve clock accuracy in a sub-microsecond range.

In some implementations, the remote radio head(s) 602 may serve as a master remote radio head to other or slave remote radio heads (not shown in FIG. 6). Upon synchronizing the remote radio head(s) 602's clock with a clock of a baseband unit (e.g., baseband unit 604), other or slave remote radio heads may synchronize its clocks with the clock of the synchronized master remote radio head(s) 602. This may allow continued radiation of signals by slave remote radio heads in the event the master remote radio head(s) 602 are not able to continue synchronizing its clock with the previously synchronized baseband unit (e.g., when the baseband unit fails).

Figure 7:
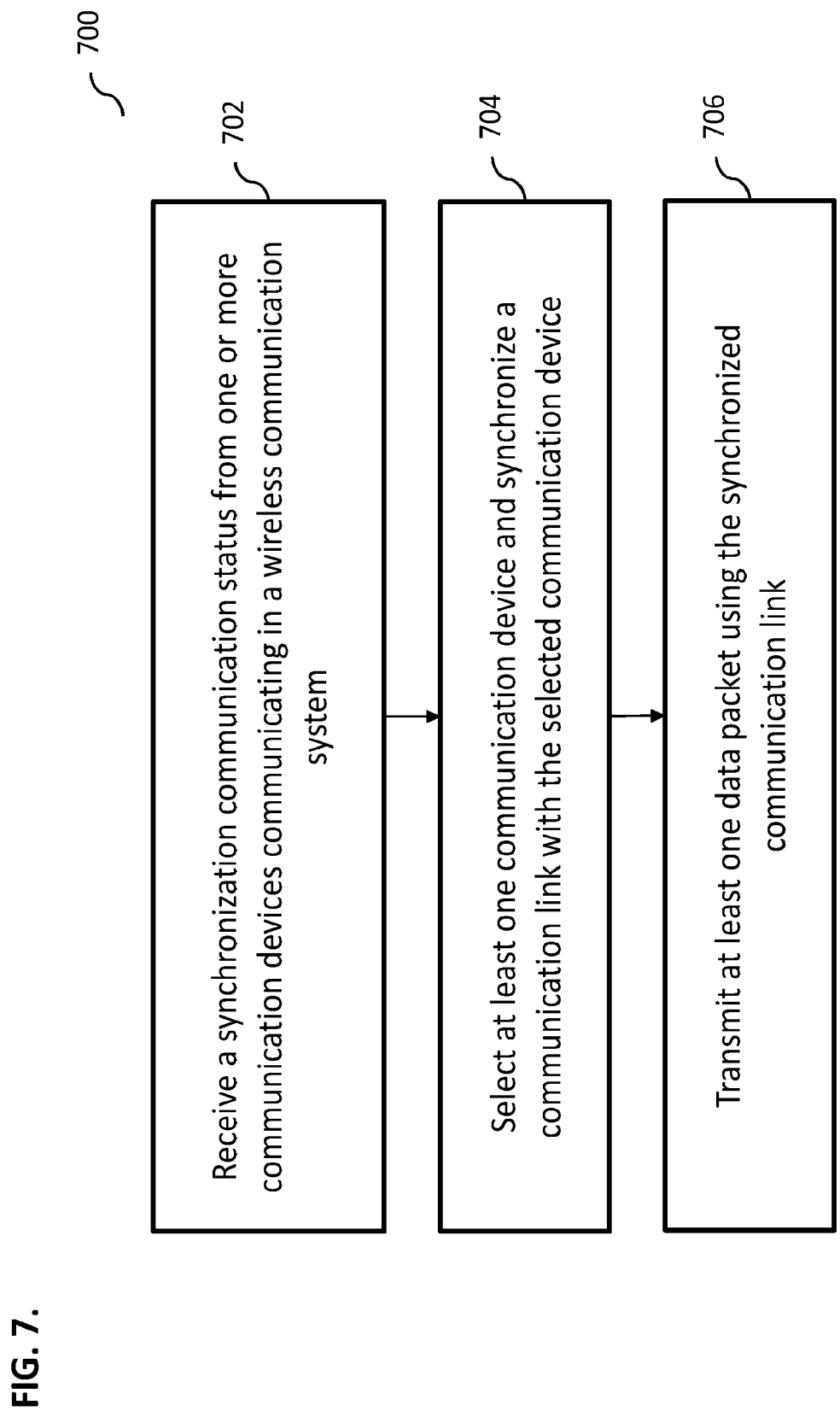
FIG. 7 illustrates an exemplary method, according to some implementations of the current subject matter.

FIG. 7 illustrates an exemplary method 700 for transmitting synchronization information in a wireless communication system, according to some implementations of the current subject matter. The method 700 may be executed by the system 600 shown in FIG. 6, and in particular may be performed by one or more remote radio head(s) 602 in combination with one or more baseband units 604, 606.

In some implementations, at least one of a base station, a gNodeB base station, an eNodeB base station, and any combination thereof and/or any portion thereof may be configured to execute the process 700. For example, one or more distributed units and one or more radio interface units having one or more remote radio heads may be configured to execute one or more operations associated with the process 700. Further, the above base station(s) may be operating in at least one of the following communications systems: a long term evolution communications system and a new radio communications system. For example, such communication systems may include a 4G, LTE, 5G, and/or any other type of wireless communication system.

At 702, one or more processors of the remote radio head(s) 602 may be configured to receive a synchronization communication status from one or more communication devices, e.g., baseband units 604, 606, etc., that may be communicating in a wireless communication system.

The synchronization communication status may be transmitted using one or more packets, e.g., CPRI packets. The status may include an information about the timing/synchronization clock information associated with the baseband unit transmitting the synchronization communication status. The status may be further indicative of a priority of a particular timing/synchronization clock being transmitted. For example, as shown in FIG. 6, baseband unit 604 may indicate that its timing/synchronization clock bears the highest priority (e.g., priority no. 1) and should be synchronized with first.

In some exemplary, non-limiting implementations, the remote radio head(s) 602 may be configured to maintain (e.g., store) an ordered list of priorities associated with clocks of each of the baseband units that are communicating with the remote radio head(s) 602. The list may be periodically updated to ensure that current information is contained in it. The remote radio head(s) 602 may be configured to use the list to determine the next priority clock to synchronize with in the event the highest priority clock has failed and/or is no longer available.

Referring back to FIG. 7, at 704, the remote radio head(s) 602 may be configured to select at least one communication device, e.g., baseband unit 604, based on the received synchronization communication status information. The selection may be based using the CPRI packets containing timing/synchronization clock information associated with each baseband unit that it receives. The remote radio head(s) 602 may use this information and compare it against the synchronization priority list that it maintains.

Based on the comparison and/or any other priority indications, the remote radio head(s) 602 may be configured to synchronize a communication link with the selected baseband unit. In particular, the clock of the remote radio head(s) 602 may be synchronized with the clock of the highest synchronization priority baseband unit (e.g., baseband unit 604). This way, the remote radio head(s) 602 and the baseband unit 604 may be synchronized and/or locked.

At 706, transmission of one or more data packets may be performed using the synchronized communication link. The data packets may contain various information that may be destined for transmission to and/or from user equipment(s).

In some implementations, as stated above, the synchronization communication status may be received using one or more CPRI packets. The packets may include a validity indicator and/or bit that may indicate a validity of the received synchronization communication status associated with one or more communication devices (e.g., baseband units) transmitting such synchronization status. For example, the validity indicator may indicate that a particular timing/synchronization clock is most recent clock that may have been provide by the timing grandmaster 608. It may also indicate a synchronization priority of the clock and/or an update to a previous synchronization priority. In some implementations, the remote radio head(s) 602 may be configured to read the validity indicator and select the baseband unit based on assessment of the validity indicator that a particular baseband unit's clock that has been received is valid and should be synchronized with.

In some implementations, as stated above, the CPRI packets may also a priority indicator indicating a communication priority associated with each communication device (e.g., baseband units 604, 606). The priority may be ranked from highest (e.g., synchronization is to be attempted and/or performed first) to lowest (e.g., which may be used when highest synchronization priority clocks are no longer valid). As such, the remote radio head(s) 602 may be configured to select the communication devices (e.g., baseband unit 604) having the highest communication priority.

In some implementations, the remote radio head(s) 602 may be configured to determine (e.g., based on transmission of data packets) that there is a failure to communicate with the selected baseband unit using the synchronized communication link. For example, the synchronization clock of a particular baseband unit is no longer valid and/or the baseband unit is no longer responding and/or otherwise, is down. In that regard, the remote radio head(s) 602 may be configured to select another baseband unit (e.g., baseband unit 606) and synchronize another communication link (e.g., link 603) with the selected baseband unit. The data packets may be transmitted using the newly synchronized communication link.

Figure 8:
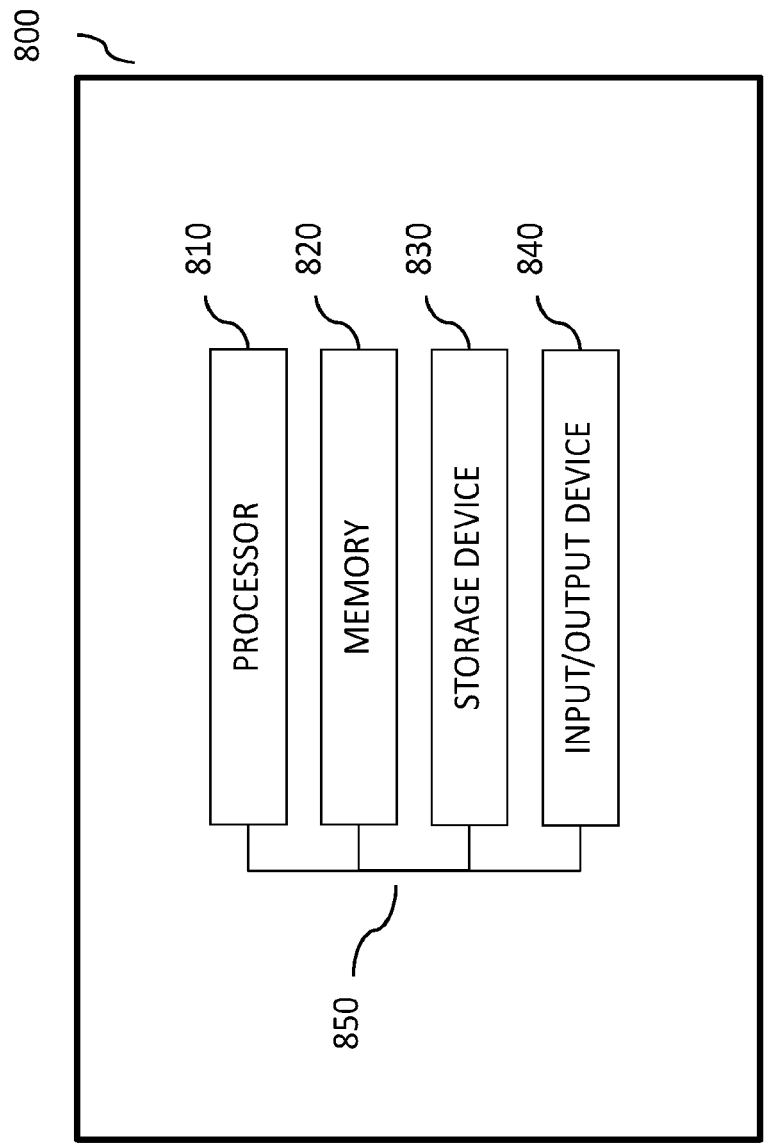
FIG. 8 illustrates an exemplary system, according to some implementations of the current subject matter.

In some implementations, the current subject matter can be configured to be implemented in a system 800, as shown in FIG. 8. The system 800 can include one or more of a processor 810, a memory 820, a storage device 830, and an input/output device 840. Each of the components 810, 820, 830 and 840 can be interconnected using a system bus 850. The processor 810 can be configured to process instructions for execution within the system 600. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer implemented method, comprising:
   receiving, using at least one processor, a synchronization communication status from one or more communication devices communicating in a wireless communication system;
   selecting, using the at least one processor, based on the received synchronization communication status, at least one communication device in the one or more communication devices, and synchronizing a communication link with the selected at least one communication device; and
   transmitting, using the at least one processor, at least one data packet using the synchronized communication link,
   wherein the receiving further comprises at least one of:
   receiving a validity indicator indicating a validity of the synchronization communication status associated with the one or more communication devices; or
   receiving a priority indicator indicating a communication priority associated with each communication device in the one or more communication devices.

2. The method according to claim 1, wherein the synchronization communication status is received using a common public radio interface (CPRI).

3. The method according to claim 1, wherein the receiving further comprises receiving the validity indicator indicating the validity of the synchronization communication status associated with the one or more communication devices.

4. The method according to claim 3, wherein the selected at least one communication device is selected based on the validity of the synchronization communication status.

5. The method according to claim 1, wherein the receiving further comprises receiving the priority indicator indicating the communication priority associated with each communication device in the one or more communication devices.

6. The method according to claim 5, wherein the selecting further comprises selecting the at least one communication devices having a highest communication priority.

7. The method according to claim 6, further comprising
   determining, based on the transmitting, a failure to communicate with the selected at least one communication device using the synchronized communication link;
   selecting at least another communication device in the one or more communication devices and synchronizing another communication link with the selected at least another communication device; and
   transmitting the at least one data packet using the synchronized another communication link.

8. The method according to claim 1, wherein the one or more communication devices include at least one of the following: a base station, a gNodeB base station, an eNodeB base station, and any combination thereof.

9. The method according to claim 8, wherein the one or more communication devices include one or more distributed units.

10. The method according to claim 9, wherein at least one of the receiving, the selecting, and the transmitting are performed by one or more radio interface units having one or more remote radio heads.

11. The method according to claim 8, wherein the base station is a base station operating in at least one of the following communications systems: a long term evolution communications system and a new radio communications system.

12. A system, comprising:
    at least one processor, and
    at least one non-transitory storage media storing instructions that, when executed by the at least one processor, cause the at least one processor to perform operations comprising:
    receiving, using at least one processor, a synchronization communication status from one or more communication devices communicating in a wireless communication system;
    selecting, using the at least one processor, based on the received synchronization communication status, at least one communication device in the one or more communication devices, and synchronizing a communication link with the selected at least one communication device; and
    transmitting, using the at least one processor, at least one data packet using the synchronized communication link,
    wherein the receiving further comprises at least one of:
    receiving a validity indicator indicating a validity of the synchronization communication status associated with the one or more communication devices; or
    receiving a priority indicator indicating a communication priority associated with each communication device in the one or more communication devices.

13. The system according to claim 12, wherein the synchronization communication status is received using a common public radio interface (CPRI).

14. The system according to claim 12, wherein the receiving further comprises receiving the validity indicator indicating the validity of the synchronization communication status associated with the one or more communication devices.

15. The system according to claim 14, wherein the selected at least one communication device is selected based on the validity of the synchronization communication status.

16. The system according to claim 12, wherein the receiving further comprises receiving the priority indicator indicating the communication priority associated with each communication device in the one or more communication devices.

17. The system according to claim 12, wherein the one or more communication devices include at least one of the following: a base station, a gNodeB base station, an eNodeB base station, and any combination thereof.

18. The system according to claim 17, wherein the one or more communication devices include one or more distributed units; and
   at least one of the receiving, the selecting, and the transmitting are performed by one or more radio interface units having one or more remote radio heads.

19. The system according to claim 17, wherein the base station is a base station operating in at least one of the following communications systems: a long term evolution communications system and a new radio communications system.

20. At least one non-transitory storage media storing instructions that, when executed by at least one processor, cause the at least one processor to perform operations comprising:
   receiving, using at least one processor, a synchronization communication status from one or more communication devices communicating in a wireless communication system;
   selecting, using the at least one processor, based on the received synchronization communication status, at least one communication device in the one or more communication devices, and synchronizing a communication link with the selected at least one communication device; and
   transmitting, using the at least one processor, at least one data packet using the synchronized communication link,
   wherein the receiving further comprises at least one of:
      receiving a validity indicator indicating a validity of the synchronization communication status associated with the one or more communication devices; or
      receiving a priority indicator indicating a communication priority associated with each communication device in the one or more communication devices.

* * * * *